US012198364B2

(12) United States Patent
Lewis et al.

(10) Patent No.: US 12,198,364 B2
(45) Date of Patent: Jan. 14, 2025

(54) COMPUTER VISION SYSTEMS AND METHODS FOR DETECTING AND MODELING FEATURES OF STRUCTURES IN IMAGES

(71) Applicant: Xactware Solutions, Inc., Lehi, UT (US)

(72) Inventors: Jeffery Devon Lewis, Orem, UT (US); Bryce Zachary Porter, Lehi, UT (US); Ryan Mark Justus, Lehi, UT (US)

(73) Assignee: Xactware Solutions, Inc., Lehi, UT (US)

( * ) Notice: Subject to any disclaimer, the term of this patent is extended or adjusted under 35 U.S.C. 154(b) by 0 days.

(21) Appl. No.: 17/499,258

(22) Filed: Oct. 12, 2021

(65) Prior Publication Data

US 2022/0028163 A1   Jan. 27, 2022

Related U.S. Application Data

(63) Continuation of application No. 16/189,339, filed on Nov. 13, 2018, now Pat. No. 11,145,073, which is a (Continued)

(51) Int. Cl.
*G06T 7/564* (2017.01)
*G06F 16/532* (2019.01)
(Continued)

(52) U.S. Cl.
CPC ............ *G06T 7/564* (2017.01); *G06F 16/532* (2019.01); *G06T 7/12* (2017.01); *G06T 7/536* (2017.01);
(Continued)

(58) Field of Classification Search
CPC ... G06T 7/0067; G06T 7/0061; G06T 7/0085; G06T 7/0097; G06T 2207/10032; G06T 2207/20044; G06F 17/30277
(Continued)

(56) References Cited

U.S. PATENT DOCUMENTS 5,671,343 A * 9/1997 Kondo .................. G06T 17/10
382/154
8,078,436 B2   12/2011 Pershing et al.
(Continued)

FOREIGN PATENT DOCUMENTS

EP        1010966 B1    10/2002

OTHER PUBLICATIONS

Office Action dated Oct. 20, 2023, issued by the Canadian Patent Office in connection with Canadian Patent Application No. 3,037,360 (5 pages).

(Continued)

*Primary Examiner* — Mark Roz
(74) *Attorney, Agent, or Firm* — McCarter & English, LLP

(57) ABSTRACT

A computer vision system and method for detecting and modeling features of a building in a plurality of images is provided. The system includes at least one computer system in communication with a database of aerial imagery, and computer vision system code executed by the at last one computer system which automatically detects contours and infers interior roof features of the building. The system first processes the plurality of images to identify a plurality of two-dimensional (2D) line segments in each image. Then, the system processes the plurality of 2D line segments to generate a plurality of three-dimensional (3D) line segments. The plurality of 2D line segments are then processed to detect a contour of the structure, and the contour of the structure is utilized by the system to infer interior roof lines from the structure. A model of the roof of the structure is finally generated using the detected contour and interior roof lines. The system can execute a straight-skeleton algorithm to infer the interior roof lines from the detected contour.

(Continued)

Additionally, the system can detect roof rakes from the images.

34 Claims, 22 Drawing Sheets

Related U.S. Application Data continuation of application No. 15/277,359, filed on Sep. 27, 2016, now Pat. No. 10,127,670.

(51) Int. Cl.
  *G06T 7/12*   (2017.01)
  *G06T 7/536*  (2017.01)
(52) U.S. Cl.
  CPC .............. *G06T 2207/10032* (2013.01); *G06T 2207/20044* (2013.01)
(58) Field of Classification Search
  USPC ......................................................... 382/154
  See application file for complete search history.

(56) References Cited

U.S. PATENT DOCUMENTS

| | | | |
|---|---|---|---|
| 8,131,514 B2 | 3/2012 | Royan et al. | |
| 8,170,840 B2 | 5/2012 | Pershing | |
| 8,209,152 B2 | 6/2012 | Pershing | |
| 8,417,061 B2 | 4/2013 | Kennedy et al. | |
| 8,422,825 B1 | 4/2013 | Neophytou et al. | |
| 8,731,234 B1 | 5/2014 | Ciarcia et al. | |
| 8,818,770 B2 | 8/2014 | Pershing | |
| 8,825,454 B2 | 9/2014 | Pershing | |
| 9,129,376 B2 | 9/2015 | Pershing | |
| 9,135,737 B2 | 9/2015 | Pershing | |
| 9,501,700 B2 | 11/2016 | Loveland et al. | |
| 9,679,227 B2 | 6/2017 | Taylor et al. | |
| 10,127,670 B2 | 11/2018 | Lewis et al. | |
| 11,145,073 B2 | 10/2021 | Lewis et al. | |
| 2011/0033110 A1* | 2/2011 | Shimamura ............... | G06T 7/55 382/173 |
| 2013/0211790 A1 | 8/2013 | Loveland et al. | |
| 2018/0089833 A1 | 3/2018 | Lewis et al. | |
| 2019/0102897 A1 | 4/2019 | Lewis et al. | |

OTHER PUBLICATIONS

Extended European Search Report dated Dec. 18, 2023, issued by the European Patent Office in connection with European Patent Application No. 23210741.7 (12 pages).
International Search Report of the International Searching Authority mailed on Jun. 11, 2018, issued in connection with International Application No. PCT/US17/53631 (4 pages).
Written Opinion of the International Searching Authority mailed on Jun. 11, 2018, issued in connection with International Application No. PCT/US17/53631 (4 pages).
Aichholzer et al., "A Novel Type of Skeleton for Polygons", Journal of Universal Computer Science, vol. 1, No. 12, 1995, pp. 752-761 (10 pages).
Applicad, "Product Bulletin—Nov. 2002: Key Features of Our Roofing Software," Nov. 2002 (46 pages).
Avrahami et al., "Extraction of 3D Spatial Polygons Based on the Overlapping Criterion for Roof Extraction from Aerial Images", CMRT05, International Archives of Photogrammetry, Remote Sensing and Spatial Information Sciences, vol. 36, part 3, Aug. 2005 (6 pages).
Biedl et al., "Weighted Straight Skeletons in the Plane", Computational Geometry, vol. 48, No. 2, 2015, pp. 120-133 (28 pages) (retrieved from https://www.ncbi.nlm.nih.gov/pmc/articles/PMC4235777/).
Felkel et al., "Straight Skeleton Implementation", Proceedings of Spring Conference on Computer Graphics, Budmerice, Slovakia, 1998, pp. 210-218 (10 pages).
Hsieh, "Design and Evaluation of a Semi-Automated Site Modeling System", Carnegie Mellon University, School of Computer Science, Nov. 1995 (83 pages).
Kelly, "Unwritten Procedural Modeling with the Straight Skeleton", Doctoral dissertation, University of Glasgow, 2014 (258 pages).
Labe et al., "Robust Techniques for Estimating Parameters of 3D Building Primitives", International Archives of Photogrammetry and Remote Sensing, vol. 32, part 2, Proceedings of the Commission II Symposium on Data Integration: Systems and Techniques, Jul. 1998, pp. 169-176 (11 pages).
Long et al., "Fully Convolutional Networks for Semantic Segmentation", Proceedings of the IEEE Conference on Computer Vision and Pattern Recognition, 2015, pp. 3431-3440 (10 pages).
McKeown et al., "Automatic Cartographic Feature Extraction Using Photogrammetric Principles", Digital Photogrammetry: an Addendum to the Manual of Photogrammetry, Chapter 9: Feature Extraction and Object Recognition, American Society For Photogrammetry and Remote Sensing, 1996, pp. 195-211 (28 pages).
Noronha et al., "Detection and Modeling of Buildings from Multiple Aerial Images," IEEE Transactions on Pattern Analysis and Machine Intelligence, vol. 23, No. 5, May 2001, pp. 501-518 (32 pages).
Von Gioi et al., "LSD: a Line Segment Detector", Image Processing on Line, vol. 2, 2012, pp. 35-55 (21 pages).
Xie et al., "Holistically-Nested Edge Detection", Proceedings of the IEEE International Conference on Computer Vision, 2015, pp. 1395-1403 (9 pages).
Notice of Allowance mailed Jul. 23, 2018, issued in connection with U.S. Appl. No. 15/277,359 (9 pages).
European Search Report dated Aug. 14, 2019, issued by the European Patent Office in connection with European Patent Application No. 17886999.6 (11 pages).
Shao, et al., "Automatic Building Outline Reconstruction Using 2D Building Data and Stereo Images," Asian Conference on Remote Sensing, Nov. 25, 2002 (7 pages).
Henricsson, "The Role of Color Attributes and Similarity Grouping in 3-D Building Reconstruction," Computer Vision and Image Understanding, Academic Press, vol. 72, No. 2, Nov. 1998 (22 pages).
Rafael Grompone von Gioi, et al., "LSD: A Line Segment Detector," Image Processing on Line, Mar. 24, 2012 (10 pages).
Laycock, et al., "Automatically Generating Roof Models from Building Footprints," WSCG Posters Proceedings, Feb. 3, 2003 (4 pages).
Office Action dated Apr. 1, 2020, issued in connection with U.S. Appl. No. 16/189,339 (10 pages).
Applicant-Initiated Interview Summary dated May 11, 2020, issued in connection with U.S. Appl. No. 16/189,339 (3 pages).
Office Action dated Nov. 6, 2020, issued in connection with U.S. Appl. No. 16/189,339 (10 pages).
Applicant-Intiiated Interview Summary dated Feb. 23, 2021, issued in connection with U.S. Appl. No. 16/189,339 (2 pages).
Communication Pursuant to Article 94(3) EPC dated May 6, 2021, issued by the European Patent Office in connection with European Patent Application No. 17886999.6 (6 pages).
Notice of Allowance dated Jun. 23, 2021, issued in connection with U.S. Appl. No. 16/189,339 (9 pages).
Laycock, et al., "Automatically Generating Roof Models from Building Footprints," published in WSCG 2003 (4 pages).
Examination Report No. 1 dated Sep. 30, 2021, issued by the Australian Patent Office in connection with Australian Patent Application No. 2017387638 (5 pages).
Examination Report No. 1 dated Sep. 8, 2023, issued by the Australian Patent Office in connection with Australian Patent Application No. 2022275479 (5 pages).
Office Action dated Nov. 13, 2024, issued by the Canadian Patent Office in connection with Canadian Patent Application No. 3,037,360 (5 pages).

\* cited by examiner

32

34

126 ↘

128 ↘

130 ⤴

132 ⤴

134

136

138

140

142

144

COMPUTER VISION SYSTEMS AND METHODS FOR DETECTING AND MODELING FEATURES OF STRUCTURES IN IMAGES

CROSS-REFERENCE TO RELATED APPLICATIONS

This application is a continuation of, and claims the benefit of priority to, U.S. patent application Ser. No. 16/189,339 filed on Nov. 13, 2018, now U.S. Pat. No. 11,145,072 issued on Oct. 12, 2021, which is a continuation of U.S. patent application Ser. No. 15/277,359 filed on Sep. 27, 2016, now U.S. Pat. No. 10,127,670 issued on Nov. 13, 2018, the entire disclosures of which are expressly incorporated herein by reference.

BACKGROUND

Technical Field

The present disclosure relates generally to the field of computer vision technology. More specifically, the present disclosure relates to computer vision systems and methods for detecting and modeling features of structures in images.

Related Art

In the computer vision field, increasingly sophisticated software-based systems are being developed for detecting various features in images. Such systems have wide applicability, including, but not limited to, medical imaging, machine vision and navigation (e.g., robot vision systems, autonomous vehicles, drones, etc.), and other fields of endeavor. In the field of aerial image processing, there is particular interest in the application of computer vision systems for automatically detecting and modeling structures that are present in such images, such as building features, rooves, etc.

In the past, photogrammetric techniques have been applied to aerial images in order to create three-dimensional models of structures in images using two-dimensional images. Generally speaking, photogrammetry is the science of making measurements from photos, and often involves the use of photos to map and measure distances between objects. Both stereoscopic and non-stereoscopic images can be processed using photogrammetric techniques in order to create a three-dimensional model of a building or other structure appearing in the images. Indeed, one known, prior art technique involves delineating features of an object in a first image (such as a top-down image), delineating features of an object in a second image (such as an oblique image), and processing the delineated features using triangulation to define the object in a three-dimensional space to create a model of the object. This approach has been utilized in commercial software packages such as PhotoModeler, which allow a user to create a 3D model of an object using multiple photos. Still further, software for detecting features of buildings in images (including roof features, measurements, etc.) has long been known. One example is the SiteCity system developed by Carnegie Mellon University in the 1990's, which creates 3D models of buildings from multiple aerial images using photogrammetric techniques.

There is currently significant interest in the computer vision space in developing systems that detect features of buildings in images with minimal user involvement. For example, it would be highly beneficial to develop systems that can automatically detect building roof features from multiple images, including interior and exterior (contour) roof features, requiring no (or, minimal) user involvement, and with a high degree of accuracy. Accordingly, the system of the present disclosure addresses these and other needs.

SUMMARY

The present disclosure relates to a computer vision system and method for detecting and modeling features of a building in a plurality of images. The system includes at least one computer system in communication with a database of aerial imagery, and computer vision system code executed by the at last one computer system which automatically detects contours and infers interior roof features of the building. The system first processes the plurality of images to identify a plurality of two-dimensional (2D) line segments in each image. Then, the system processes the plurality of 2D line segments to generate a plurality of three-dimensional (3D) line segments. The plurality of 2D line segments are then processed to detect a contour of the structure, and the contour of the structure is utilized by the system to infer interior roof lines from the structure. A model of the roof of the structure is finally generated using the detected contour and interior roof lines. The system can execute a straight-skeleton algorithm to infer the interior roof lines from the detected contour. Additionally, the system can detect roof rakes from the images.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to a computer vision systems and methods for detecting and modeling features of structures in images, such as roofs and other features of buildings, as described in detail below in connection with FIGS. 1-15.

Figure 1:
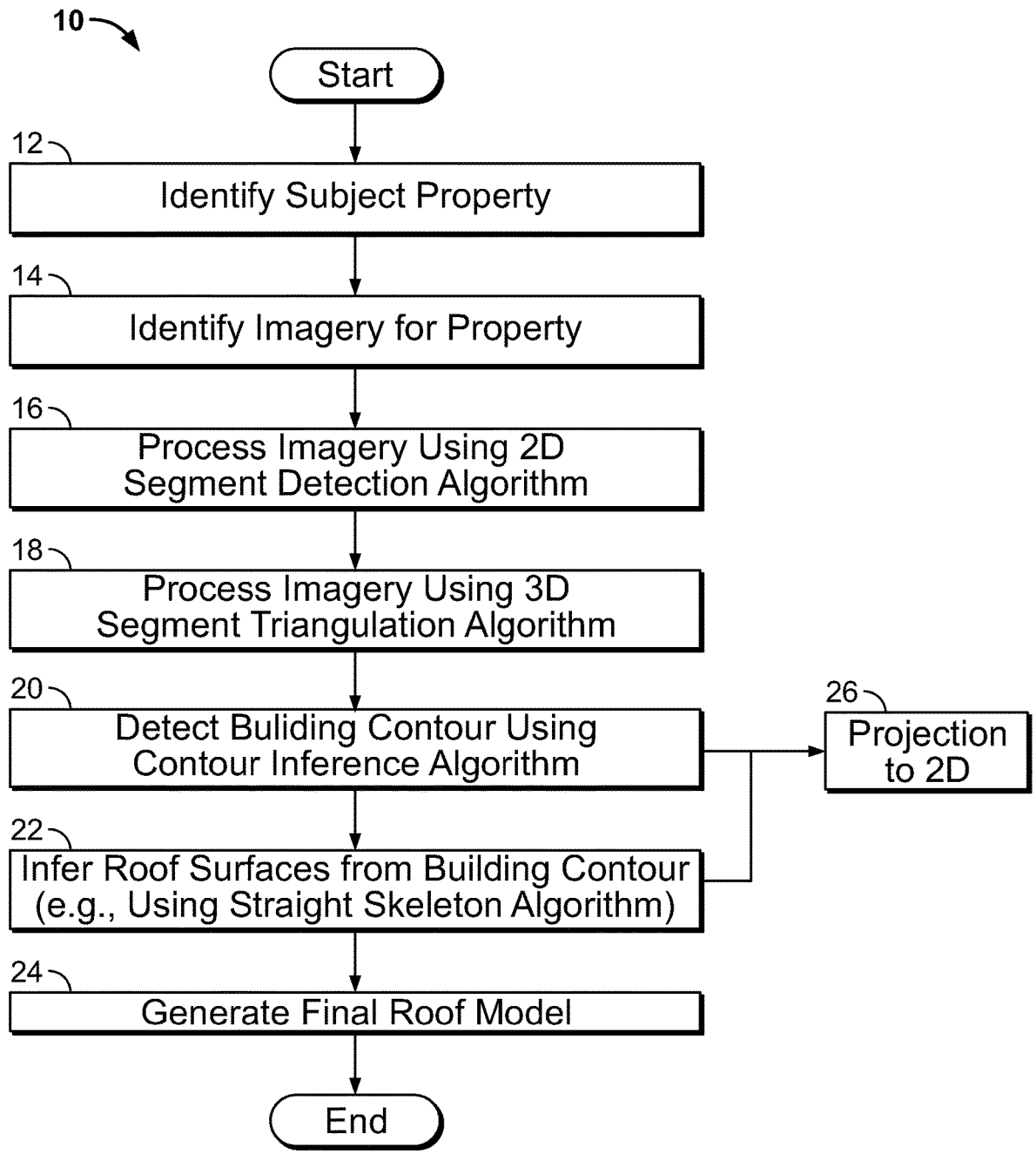
FIG. 1 is a flowchart illustrating processing steps carried out by the computer vision system of the present disclosure.

Turning to the drawings, FIG. 1 is a flowchart illustrating processing steps carried out by the computer vision system of the present disclosure, indicated generally at 10. The computer vision system of the present disclosure allows for the rapid and accurate detection of features of structures (e.g., commercial and residential buildings), such as roof features, and the generation of three-dimensional models of such features. The steps 10 represent a complete roof inference "pipeline" of associated algorithms and processes that detect the contour of a building given aerial imagery (with corresponding camera parameters), and infer the roof surfaces (including the edges of such surfaces) from the contour. The pipeline consists of several distinct phases, each with their own outputs which are inputs into the next phase.

Beginning in step 12, the system identifies a subject property for which processing is desired. The property could be identified by any suitable identifier, such as postal address, latitude and longitude coordinates, Global Positioning System (GPS) coordinates, or any other suitable identifier. Then, in step 14, several different images (or, views) of the subject property are obtained. The images could include, but are not limited to, aerial images, satellite images, etc., taken from various angles including, but not limited to, nadir views, oblique views, etc. In step 16, the images are processed to identify two-dimensional (2D) line segments in each image using a 2D line segment detection algorithm. Such an algorithm is described in detail below. Then, in step 18, three-dimensional (3D) lines are then triangulated from the different views of the 2D lines using a triangulation algorithm, and the consensus "best" 3D lines are kept. The 3D lines obtained from triangulation are a noisy approximation of the building contour.

In step 20, the complete contour is inferred from these noisy lines using a contour inference algorithm that snaps lines to a grid and infers the remaining lines to create a complete, closed contour. Then, in step 22, the complete contour is then processed to infer interior roof lines from the contour. This could be accomplished by running the contour through the "straight skeleton" algorithm, as described in greater detail below. The straight skeleton algorithm is also outlined in the article entitled "Unwritten Procedural Modeling with the Straight Skeleton" (Kelly, 2014) and incorporated herein by reference in its entirety. After processing in step 22, the final roof model is generated in step 24. The model could be included in a roof estimate report if desired, transmitted to a third party, transmitted to another computer system/platform, or utilized as otherwise desired by a user of the system. Optionally, in step 26, the detected roof contour and inferred interior roof lines generated in steps 20 and 22 could be projected to two dimensions in step 26, if desired.

Figure 2A:
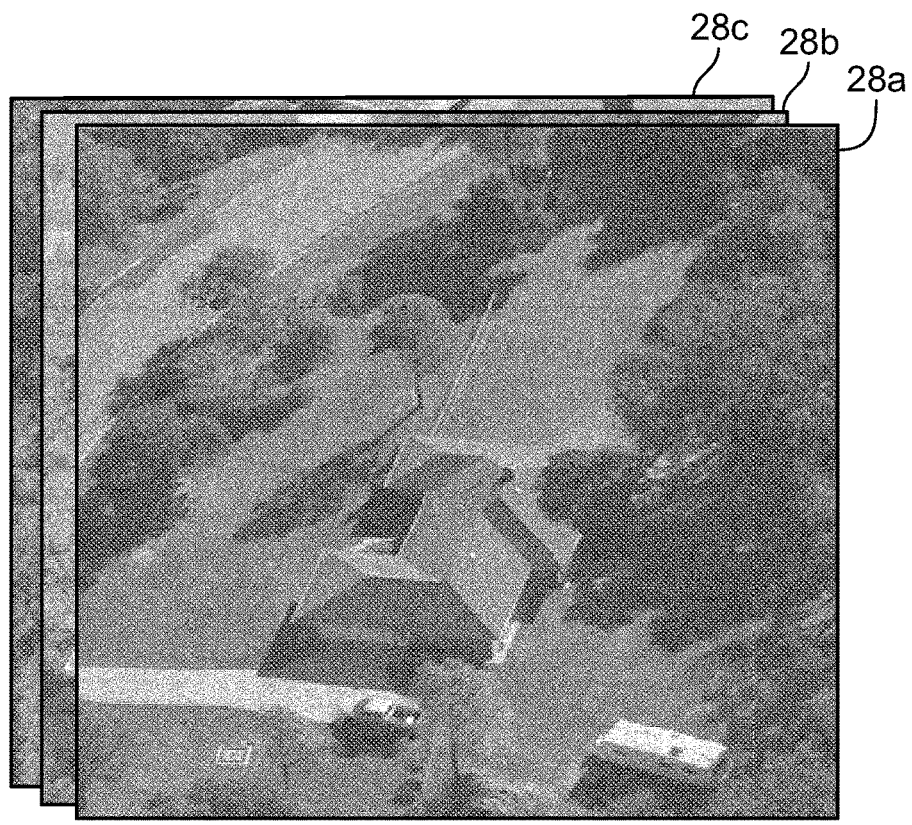
FIGS. 2A-2E are images illustrating the processing steps of FIG. 1 carried out by the computer vision system of the present disclosure.
Figure 2B:
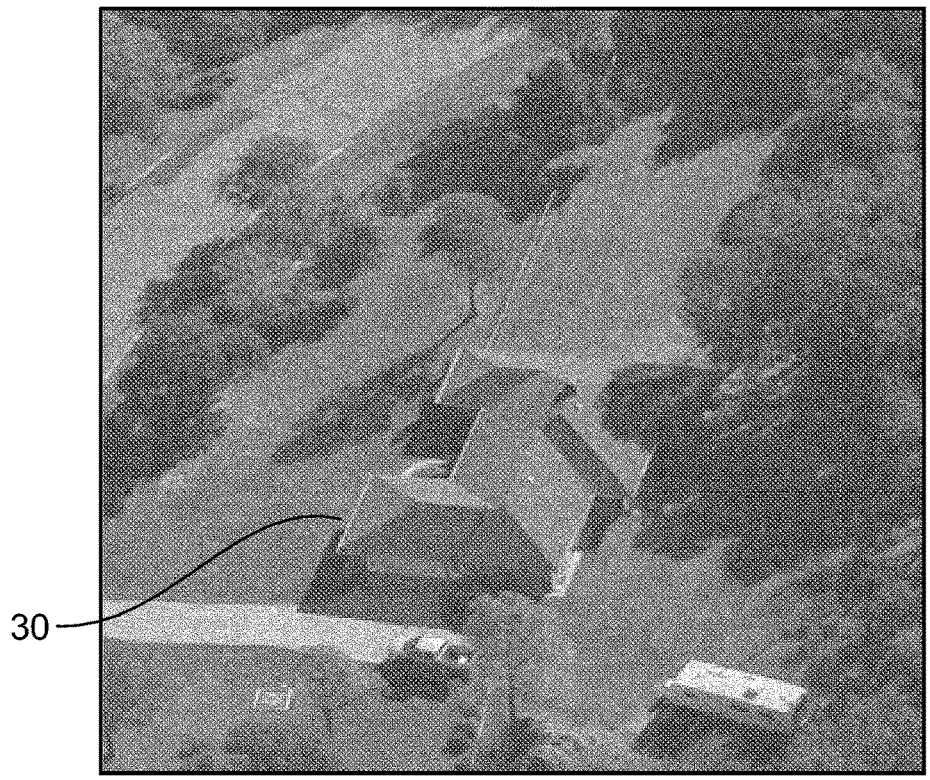
Figure 2C:
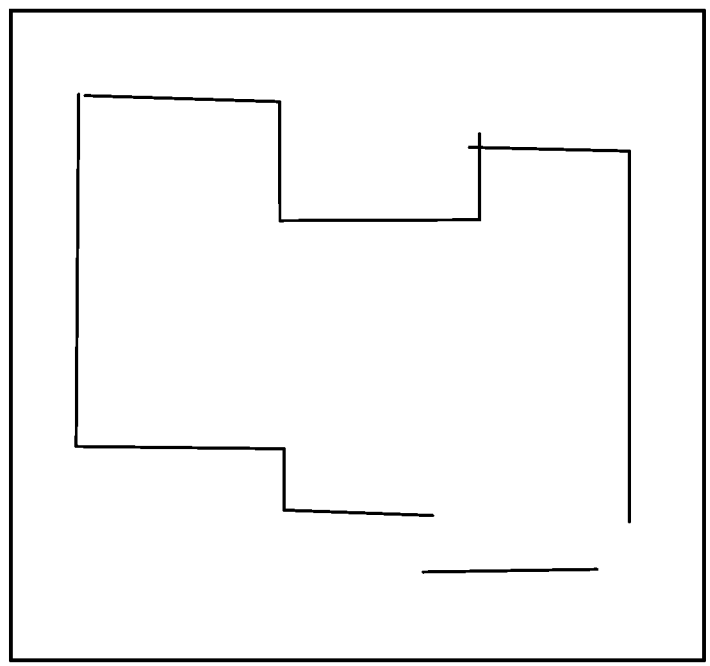
Figure 2D:
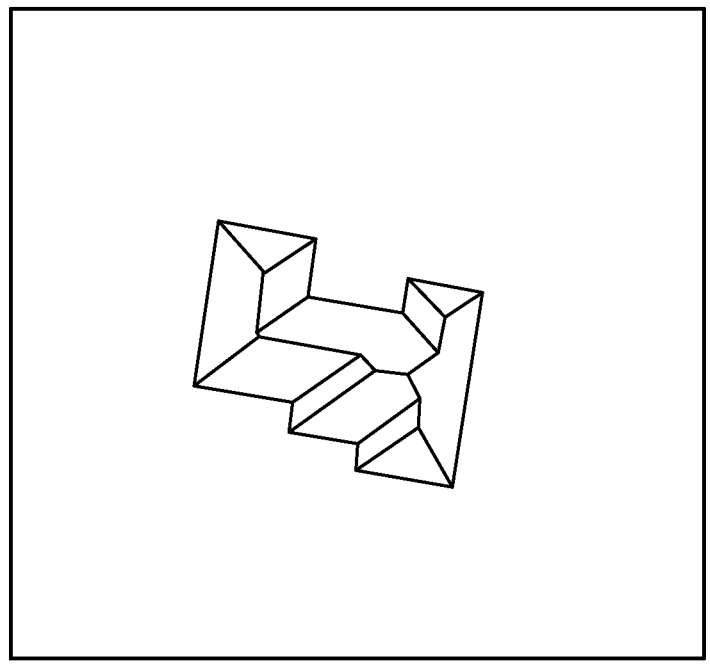
Figure 2E:
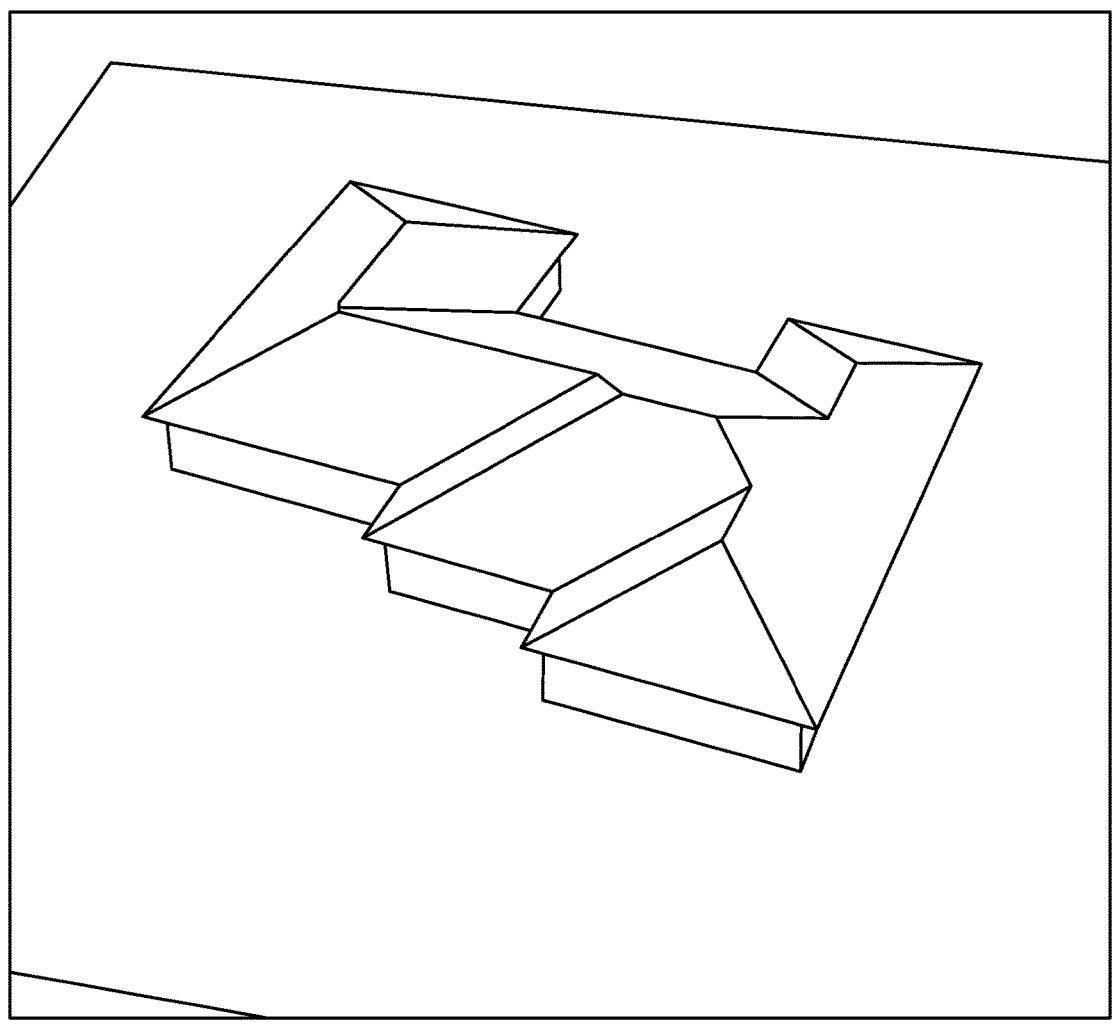

FIGS. 2A-2E are images illustrating the processing steps of FIG. 1 carried out by the computer vision system of the present disclosure. As shown in FIG. 2A, the system begins by obtaining imagery of a subject property taken from different views 28a-28c. The views could include, but are not limited to, oblique imagery of a building, nadir imagery, and other views. Then, as shown in FIG. 2B, a 2D segmentation algorithm is applied to the images to detect exterior lines 30 of the building in the images. Lines from several images could be detected. Next, as shown in FIG. 2C, a 3D triangulation is performed using the detected exterior lines 30, and the contour of the building (illustrated in image 32) is detected using contour inference as disclosed herein. Then, as shown in FIG. 2D, the interior lines of the building (e.g., roof features as gables, ridge lines, etc.) are inferred from the contour of the building using a straight skeleton algorithm, and illustrated in the image 34. Finally, as shown in FIG. 2E, a three-dimensional model 36 of the building is generated. Optionally, as noted in step 126 of FIG. 1, modeled building lines can be projected back onto the different 2D views. This is not a necessary step of the pipeline, but rather, a separate output that can be used for testing and has intrinsic value as its own data package.

Figure 3:
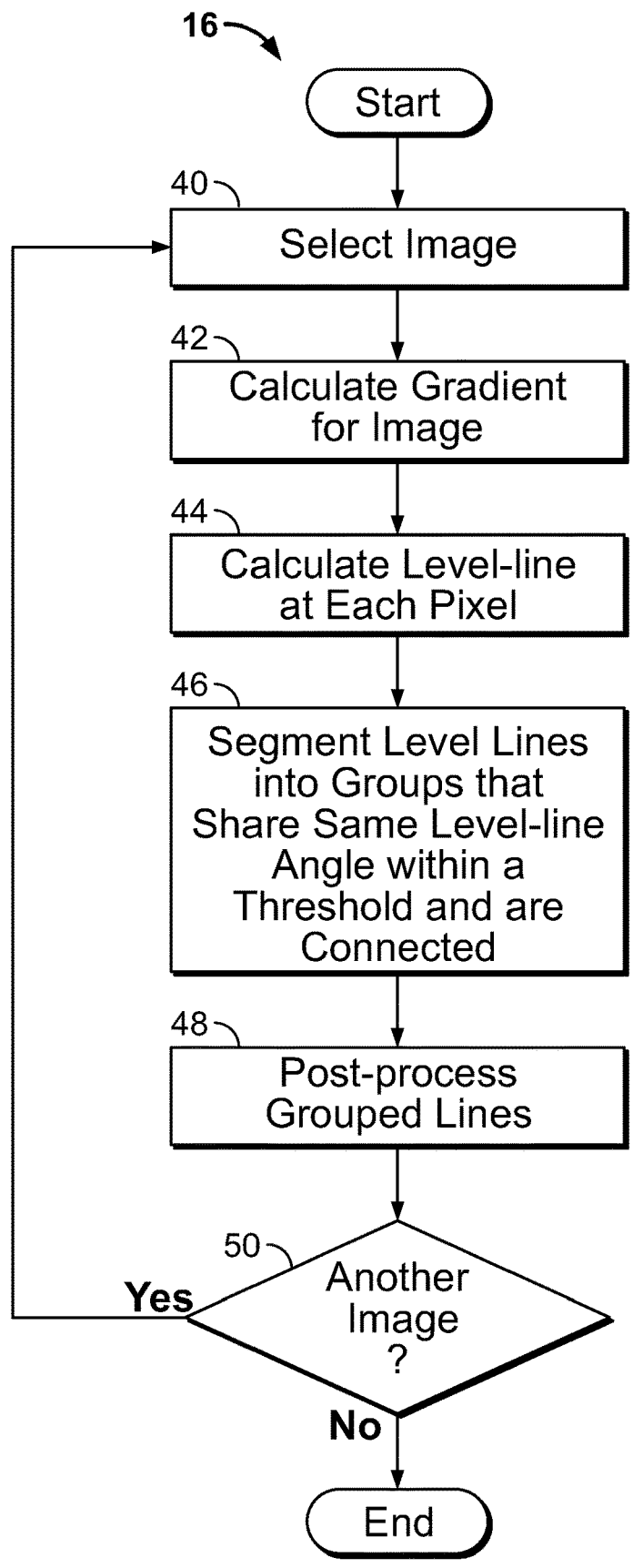
FIG. 3 is a flowchart illustrating step 16 of FIG. 1 in greater detail.

FIG. 3 is a flowchart illustrating step 16 of FIG. 1 in greater detail. Beginning in step 40, input imagery is selected. Input aerial imagery can include images of large neighborhoods, and in each image several properties are present. Therefore, a crop of the image called a region of interest (ROI) is taken where the input property is centered in the crop, and the size of the crop corresponds to the size of the property parcel. Several different points of view of each ROI are gathered since this allows for the construction of epipolar planes which will be used later in the 3D segment inference phase. Once imagery is obtained, each image is run through a line detection algorithm, as follows. In step 42, the gradient of the image is calculated. Then, in step 44, the system calculates the level-line at each pixel, which is a line orthogonal to the direction of the gradient at a pixel. Next, in step 46, the system segments the level lines into groups that share the same level-line angle within a threshold and are connected. Each of these groups is treated as a potential line segment by the system. In this step, the system approximates each group with a rectangle, and iteratively refines the rectangle according to number of aligned pixels it contains, until its height is a single pixel (within a tolerance), which is the final detected line segment.

Figure 4A:
FIGS. 4A-4B are images illustrating post-processing of line segments detected by the system of the present disclosure.
Figure 4B:

It is noted that the line detection algorithm may attempt to detect all lines in the image, which include interior roof lines, sidewalks, neighboring properties and buildings, etc. As such, there is a need to refine the results so that they include only lines on the contour of the building of interest. Therefore, a post-processing is performed on the line detection output (grouped lines) in step 48, which retains only the lines of interest. This can be performed using two different convolutional neural networks trained to detect roof lines and buildings to produce this refinement. The process is illustrated in FIGS. 4A-4B. As shown in FIG. 4A, the output of the line detection algorithm is shown in the image 52, wherein not only are lines delineated on a property of interest, but also on other structures such as roads, walkways, fences, other buildings, etc. As shown in FIG. 4B, the post-processed results are shown in the image 54. As can be seen, only the lines on the contour of the building of interest (the building in the center of the image) are kept). Referring back to FIG. 3, in step 50, a determination is made as to whether another image should be processed. If so, control returns to step 40; otherwise, this phase of the pipeline ends.

Figure 5:
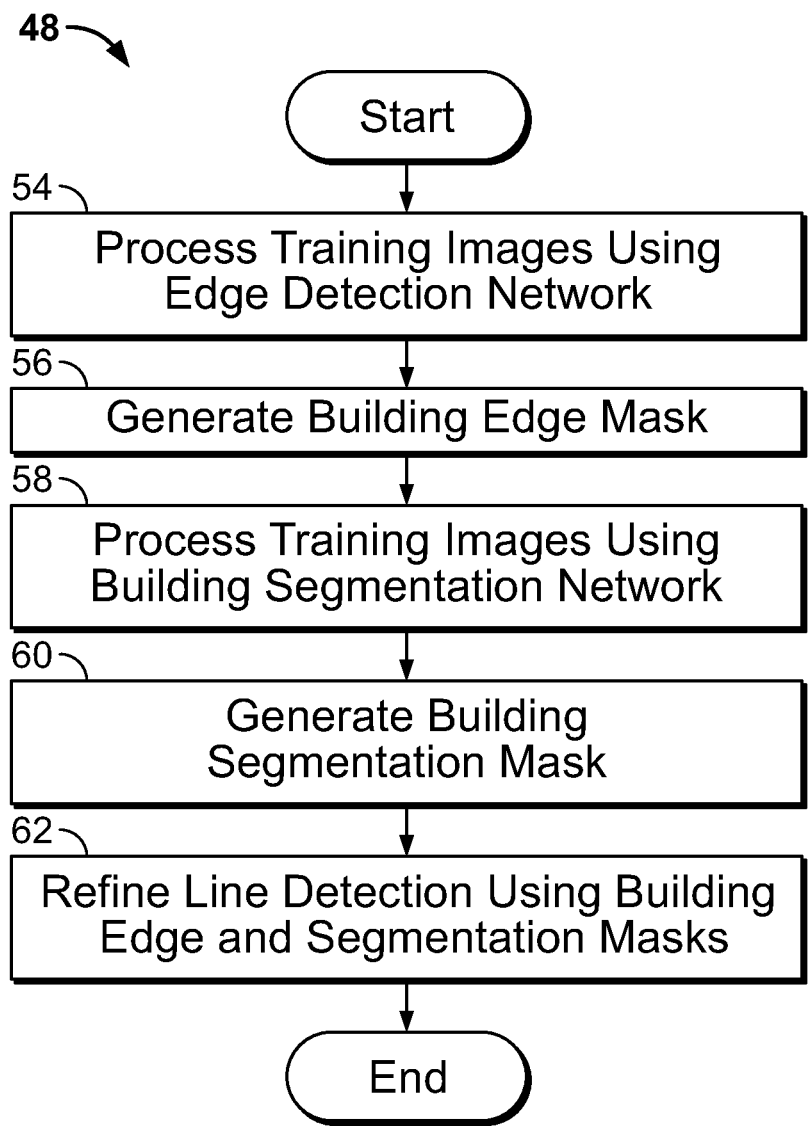
FIG. 5 is a flowchart illustrating processing step 48 of FIG. 3 in greater detail.

FIG. 5 is a flowchart illustrating processing step 48 of FIG. 3 in greater detail. As mentioned above, neural networks can be trained and used to remove unwanted 2D lines. Preferably two neural networks are used: a suitable edge detection neural network (such as the Holisitic Edge Degection (HED) network discussed below, although other edge detection neural networks known in the art could be utilized), and a building segmentation network. These are now described in detail. In step 54, the system processes training images using the HED network. The HED network uses the architecture outlined in the article entitled "Holistically-nested edge detection" Xi, 2015), the entire disclosure of which is expressly incorporated herein by reference. These networks are specifically designed for edge detection. The HED network is a multi-scale convolutional neural network in which edge features are hierarchically learned at various levels of visual detail. The architecture is a single-stream deep network that produces an edge map output at various scales. A weighted average of these edge maps is also learned and produced. The HED network was trained on a data set of 162,372 images from selected properties which have been previously modeled. All image pixels that correspond to roof lines were set as positive training examples for the network and all other pixels were set as background, or negative, examples for the network. After training the network for 100,000 iterations, the final trained network is used for inference. In step 56, inference is performed to generate a building edge mask. A threshold is applied to the output of the edge detection network such that all pixels that correspond to values above the threshold are treated as lines. By way of non-limiting example, it has been found that a threshold of 0.65 is suitable (but other thresholds could be used). The sigmoid produces an output between 0 and 1, which indicates the probability of a pixel being an edge a little bit higher. In addition to simple thresholding, the system could also use line thinning techniques such as non-maximal suppression to refine the output from the neural network. The final output produces a binary mask of possible roof lines. This mask is illustrated as the mask 64 shown in FIG. 6A.

In step 58, the training images are processed using a second neural network, i.e., a building segmentation network. The building segmentation network is a fully convolutional network (FCN) with stride 8 (8s) using the architecture described in the article "Fully Convolutional Networks for Semantic Segmentation" (Long, et al. 2015), the entire disclosure of which is expressly incorporated herein by reference. FCN is described in detail as follows. FCN is a convolutional neural network that is used to label every pixel in a given input image. It is trained starting at a coarse level of detail, and refined at finer scales. It is composed of multiple convolutional layers. Predicted scores are generated by a 1x1 convolution with channel dimensions that match the number of data labels. The predicted scores are followed by a deconvolution layer to up-sample the output scores to a pixel-level prediction. This network was trained on the same set of 162,372 images, but with the positive training examples being all pixels that correspond to the roof model, as opposed to just the lines. Training took place over 250,000 iterations. In step 60, inference is performed by simply taking the output of the final layer which produces either 1 or 0 for roof or background, respectively. The output is a building segmentation mask such as the mask 68 shown in FIG. 6B. It is noted that other convolution networks known in the art could be utilized in place of FCN, provided that such networks are capable of learning a pixel level segmentation from raw input images and annotated ground truth.

Figure 6A:
FIGS. 6A-6E are images illustrating generation of building masks and refinement of line segment detection carried out by the system of the present disclosure.
Figure 6B:
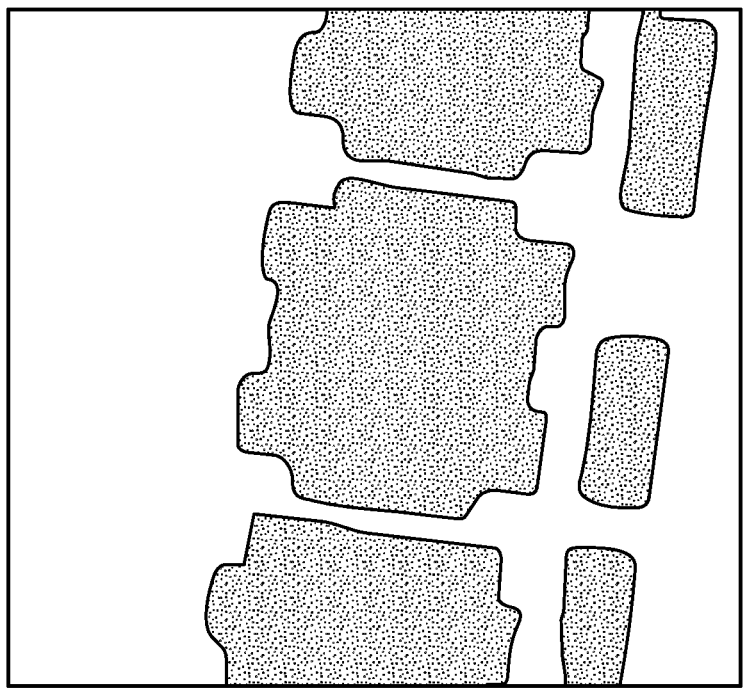
Figure 6C:
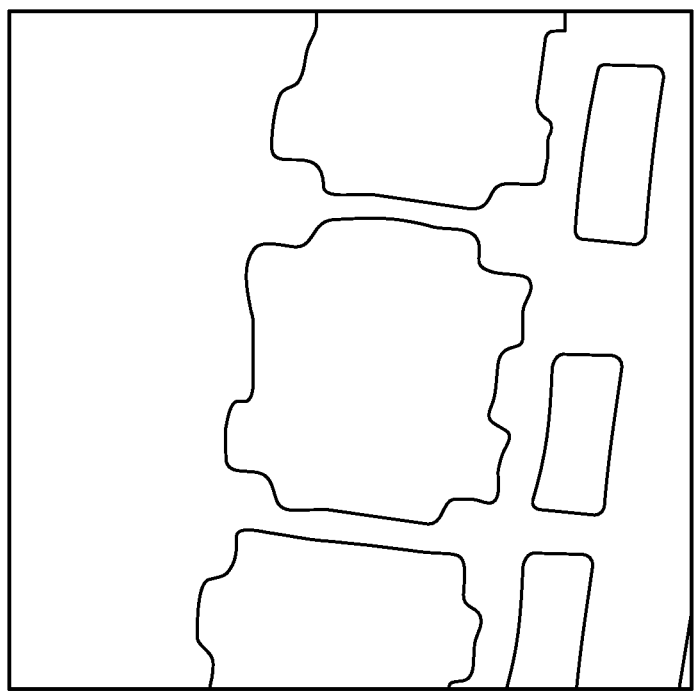
Figure 6D:
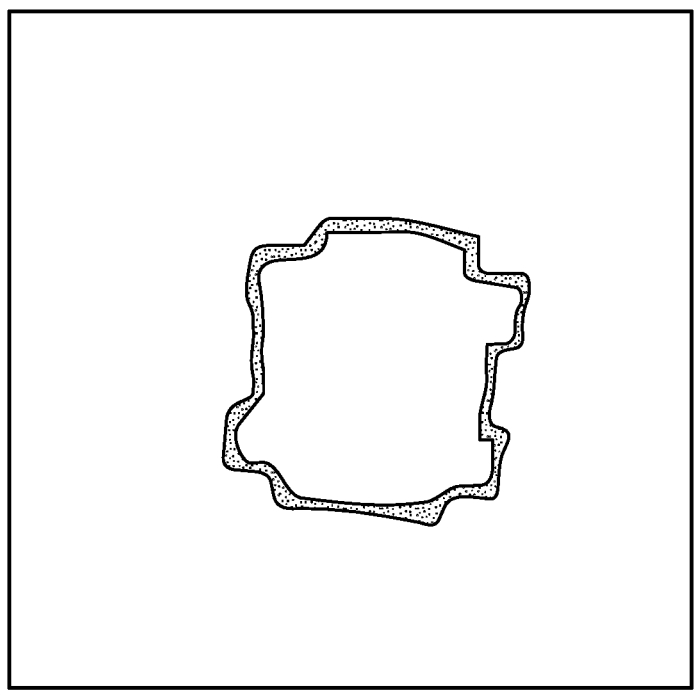
Figure 6E:
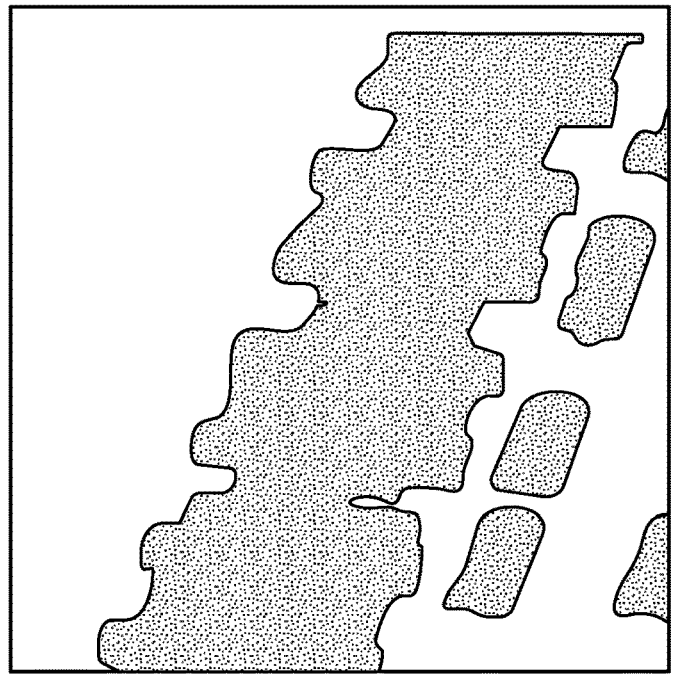

In step 62, the line segments identified by the line detection algorithm are then revised using both the building edge and segmentation masks generated in steps 56 and 60. The goal is to isolate the central building, and keep only the lines that lie on the contour. The central building is isolated from the building segmentation mask by first finding all of the contours in the mask and then performing a point in polygon test with the center point in the image on each contour. The central most contour is then dilated and kept. This process is illustrated in FIGS. 6C-6E. As can be seen in the image 70 in FIG. 6C, the system identifies exterior contours of structures, each of which has a center point. As can be seen, the contours correspond to the structures identified in the mask shown in the image 68 of FIG. 6B. Then, as shown in the image 72 in FIG. 6D, the final mask is generated by the system after post-processing of the image (e.g., step 48 of FIG. 5), as discussed herein.

It is noted that the final masks generated by the system are created for each view, and only the detected lines that have at least 50% overlap with the mask are kept. This yields detected lines for each view that are on the building of interest and approximately on the contour. This technique works well if a contour of the individual building can be extracted from the mask. In images that are nadir (top-down) this is an easy task, but in oblique imagery, the building segmentation network does not distinguish well between neighboring structures. This can result in the contour running together (spanning multiple physical structures), as illustrated in the image 74 in FIG. 6E. This issue is addressed in the next phase (step 18 of FIG. 1) to produce the triangulated 3D lines that are only on the building of interest and not neighboring structures.

Figure 7:
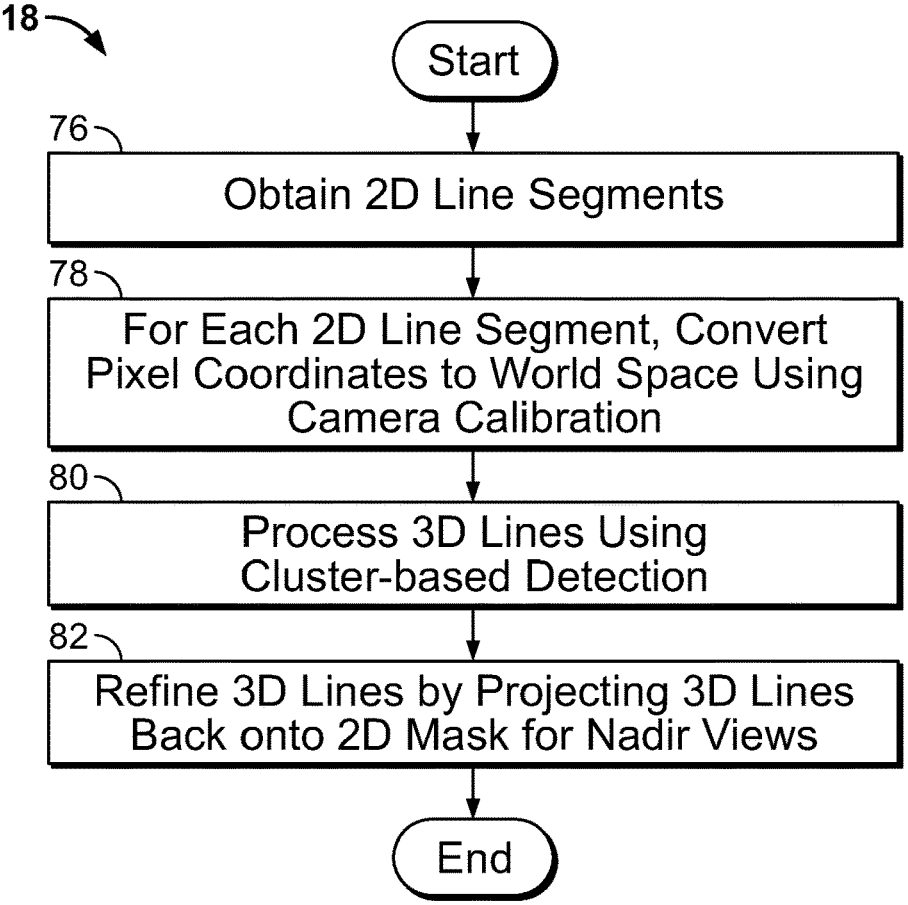
FIG. 7 is a flowchart illustrating step 18 of FIG. 1 in greater detail.
Figure 8:
FIG. 8 is an image of a building having multiple eave heights and capable of being processed by the system of the present disclosure to generate multiple building contours.

FIG. 7 is a flowchart illustrating step 18 of FIG. 1 in greater detail. In step 18, the system carries out a 3D segment inference phase that takes as input the filtered 2D detected line segments and produces triangulated 3D segments based off of the epipolar geometry of the 2D lines given intrinsic and extrinsic camera parameters for each 2D image. There are two reasons for triangulating to 3D. First, the lines from the 2D segment detection are not a complete contour, and the next phase will infer the remaining lines to produce a complete contour. The inference algorithm operates on 3D lines in world coordinates, since the lines in 2D pixel space are rotated or skewed based on the perspective of the image, and geometry calculations are inaccurate compared to the real lines in world space. Second, having the z values of the lines allows for detection of cases where there are multiple complete contours on a single building. For example, the image 84 shown in FIG. 8 has multiple eave heights and should be treated as separate contours.

Step 18 begins with step 76, wherein the system obtains the 2D detected line segments. Each line detected on an image is a projection of a certain edge on the ground, according to an observation point. In step 78, the pixel coordinates of each 2d line segment are converted to world space using camera calibration information, so that 3D lines can be obtained. For any pair of observations where the same edge is projected, the 3D line containing the edge can be reconstructed from the crossing of two planes, each one defined by the line projected on the ground and the observation point. However, for any pair of observations, many lines are available, and it can thus be difficult to establish the corresponding pairs. This issue can be accomplished using a cluster detection technique in step 80.

Regarding cluster detection in step 80, it has been found that, when observing lines on the ground from different observation points the following is true: ground projections which are identical from different observation points correspond to lines actually on the ground (since the system projects ground projections onto the same plane as the current plane (relying on the real ground in the image matching the estimated ground plane), and since the system utilizes a horizontal plane to estimate the ground at the building), horizontal 3D lines yield parallel ground projections (since the lines are horizontal, the system projects onto a horizontal plane, and there is translation of the line), and non-horizontal 3D lines yield ground projections which intersect at the same point where the 3D lines crosses the ground (since the point is already on the plane being projected onto, so that the projection is the same point as the original). If all planes are intersected against each other, those corresponding to the same real 3D edge will be represented by the same 3D line and the same (or similar) solution will be obtained a number of times. The duplication of the same, or similar, 3D line is used to select the final solutions through clustering. Small clusters are discarded and the centroid of each large cluster is taken as a solution.

In step 82, the 3D lines are refined by projecting the 3D lines back onto the 2D mask for nadir views. As mentioned above in connection with refinements of the 2D segment detection phase, the 3D lines are refined by projecting them back on to the 2D mask, but only for the nadir views. Now, using the same approach as described previously, it is possible to keep only those 3D lines whose projection is in some number nadir images and has some threshold of overlap. This threshold could be selected so that lines can be retained which have any amount of overlap with at least two of the building segmentations in the nadir view (e.g., the threshold is >0 pixels overlap in at least two nadir images). This helps to ensure the 3D lines are on the building of interest by removing lines picked up in oblique imagery. In the oblique view, it is more likely that there will not be a distinct region of 'non-building' pixels to separate the buildings. Because of this, the system utilizes the nadir images to segment the building instances as this view is more likely to have a pixel gap between adjacent buildings. Sometimes, even with the nadir images, there is some overlap between the buildings in pixel space. This is due to a number of factors including the nadir images not being exactly above the building, the presence of densely packed buildings, and inaccuracies in the network output. Because of this, networks can be utilized that perform instance segmentation instead of merely semantic segmentation.

Figure 9A:
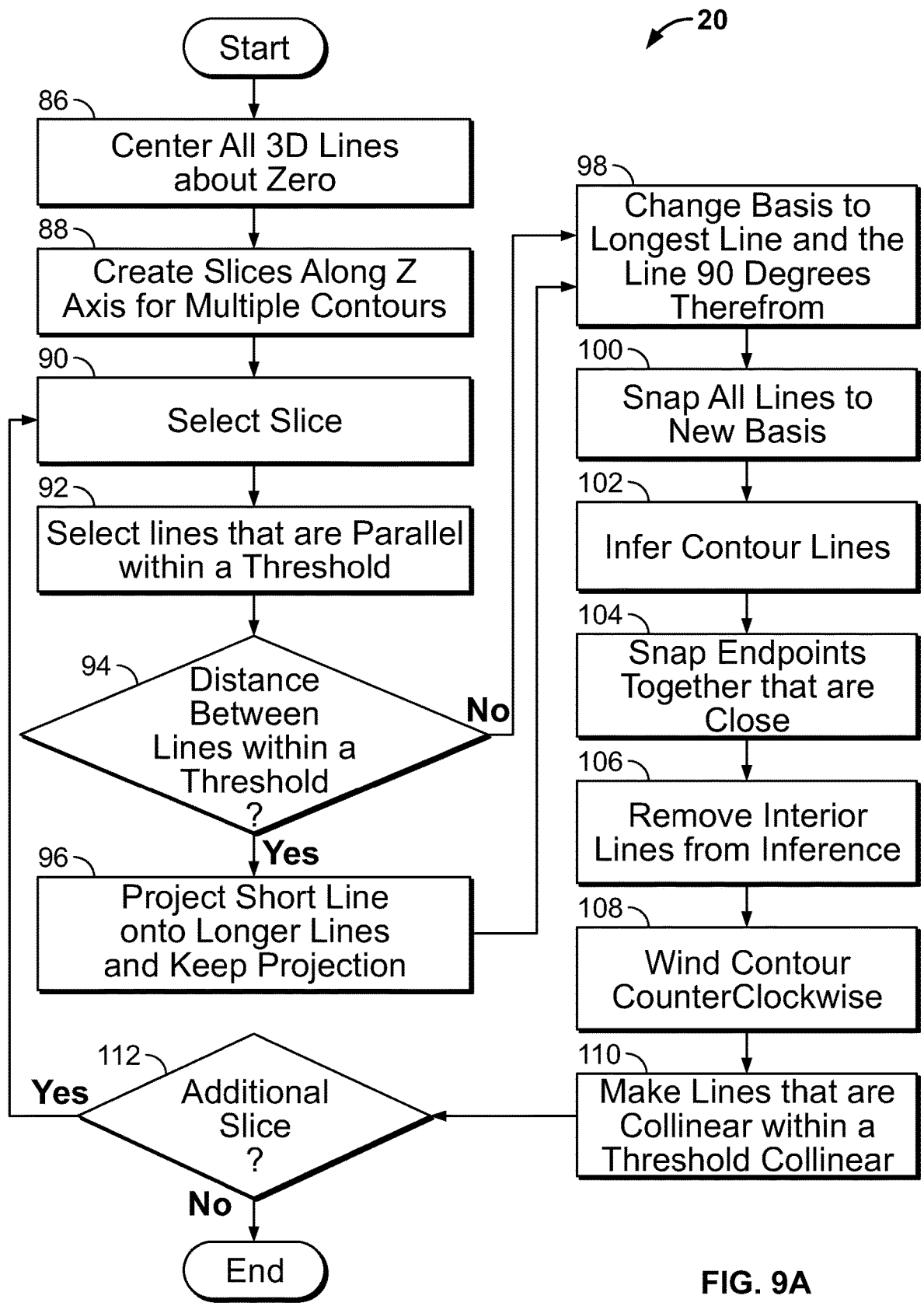
FIG. 9A is a flowchart illustrating step 20 of FIG. 1 in greater detail.

FIG. 9A is a flowchart illustrating step 20 of FIG. 1 in greater detail. Step 20 comprises a phase of several steps designed to infer a complete contour of a structure from the 3D lines. The images 126-140 in FIGS. 10A-10H illustrate a sample 3D input being processed through all steps up to the final inferred contour. The images 126-140 show, respectively, the original image (126), the generated 3D top-down view (128), the generated 3D side view (130), the projected view (132), the model snapped to a grid (134), the contour inferred (136), the model with snapped endpoints (138), and the complete model (140).

Turning back to FIG. 9A, the algorithm of step 20 occurs as follows. First, in step 86, all 3D lines in the image are centered about zero (this aids in the calculations that will be performed due to computational restraints with floating point numbers, since, originally, the lines are stored in Universal Transverse Mercator (UTM) coordinates and the values could be in the hundreds of thousands). Then, in step 88, the system creates "slices" along z axis for multiple contours, and flattens all lines in a "z-slice" to median z value. For each slice, the following steps then occur. In step 90, the system first selects a slice. Then, in step 92, the system selects lines that are parallel within a threshold. In step 94, for lines that are parallel within a threshold, a determination is made as to whether the distance between lines is small within a threshold. If so, step 96, occurs, wherein the system projects short lines onto longer lines and keeps the projection. This step collapses/simplifies the lines by creating "consensus" lines.

In step 98, the system changes the basis to the longest line and the line 90 degrees from the longest line. Then, in step 100, the system snaps all lines to a new basis. In step 102, the system infers contour lines (described in more detail in FIG. 9B, discussed below), and in step 104, the system snaps endpoints together that are close. In step 106, the system removes interior lines from the inference. Then, in step 108, the system winds contour counterclockwise (e.g., the system ensures that the contour vertices are in counter-clockwise order). Specifically, a contour's winding refers to the order of the points in the coordinate system in which they are defined. In this case, it is desirable for the points to be ordered counter-clockwise in the coordinate system. This is a requirement of the straight skeleton algorithm discussed herein, such that input contours are always ordered the same way. After this step, a polygon is produced, and assuming that the system is using a right handed coordinate system, the face of the polygon can be envisioned as pointing either up or down. A counter-clockwise winding corresponds to the polygon facing up. Consistency is required so that the system can look at a single line segment in the polygon and know which side of it is inside the polygon, versus outside. In this coordinate system, if the system takes the line segments direction vector and rotates them +90 degrees counter clockwise, this will produce a vector that is points to the interior of the contour polygon. In step 110, the system makes lines that are collinear within a threshold, collinear. Finally, in step 112, a determination is made as to whether another slice should be processed. If so, control returns to step 90; otherwise, this phase ends.

Figure 9B:
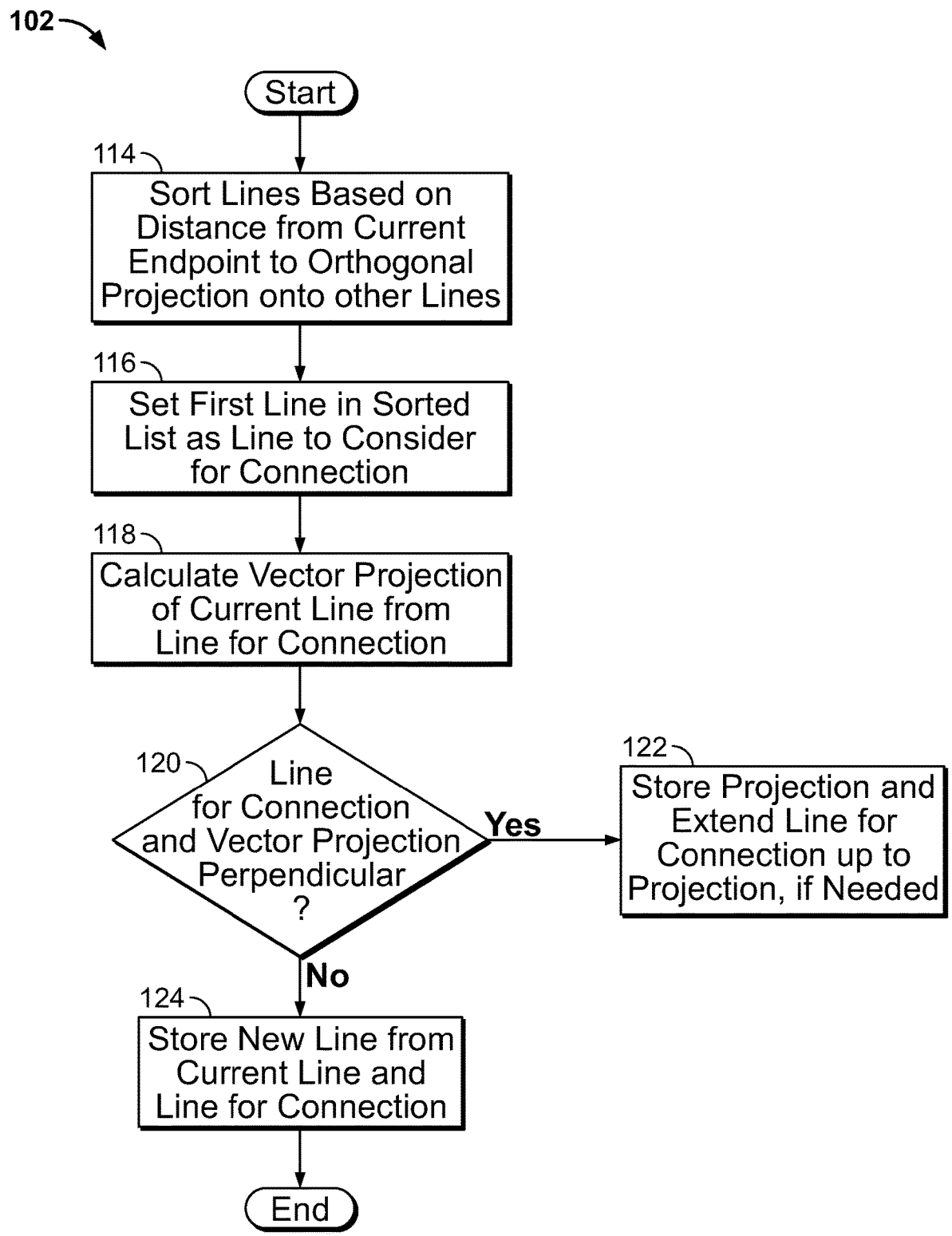
FIG. 9B is a flowchart illustrating step 102 of FIG. 9A in greater detail.
Figure 10A:
FIGS. 10A-10H are images illustrating a sample 3D input being processed by the system of the present disclosure to produce a final building contour.
Figure 10B:
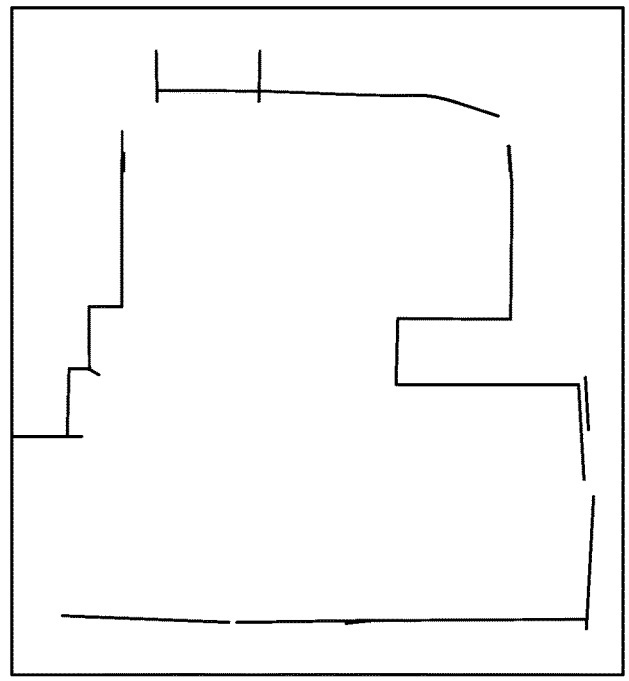
Figure 10C:
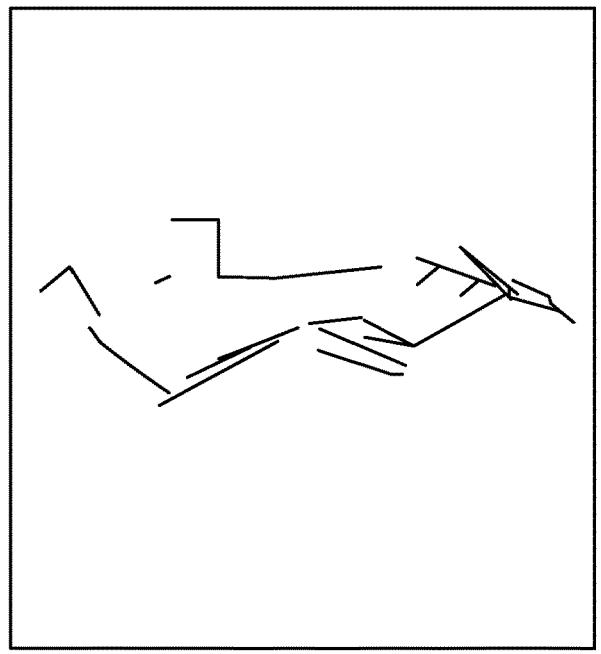
Figure 10D:
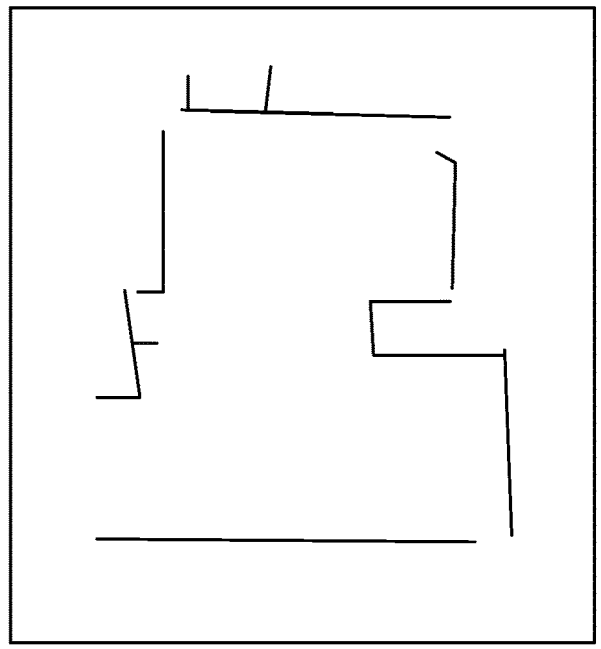
Figure 10E:
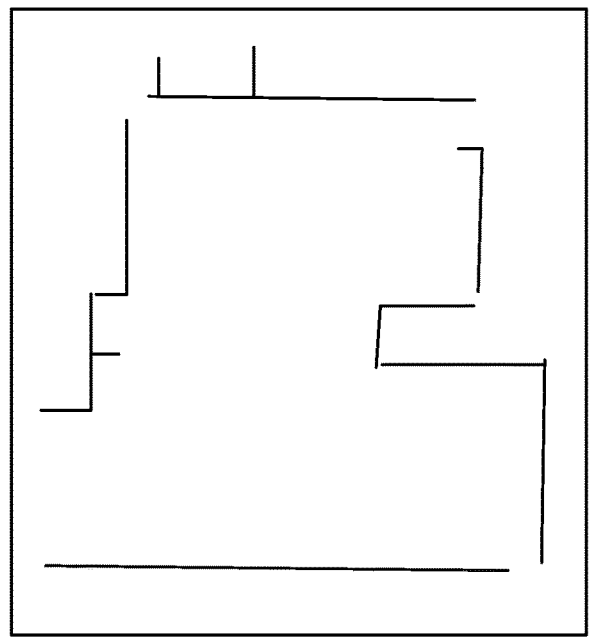
Figure 10F:
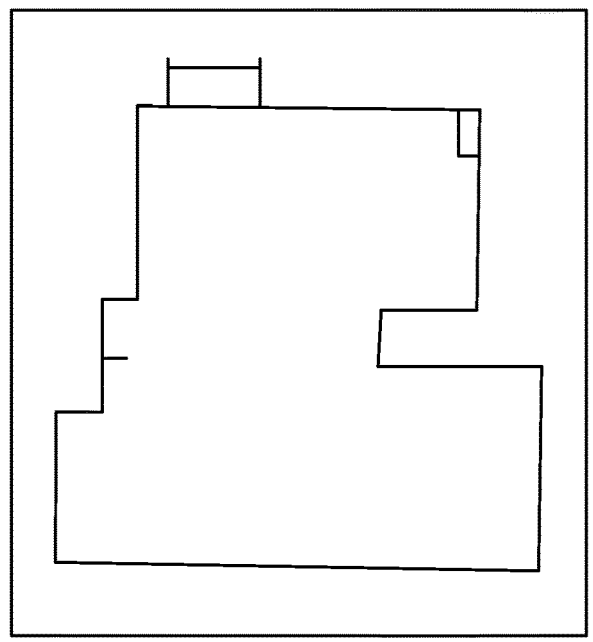
Figure 10G:
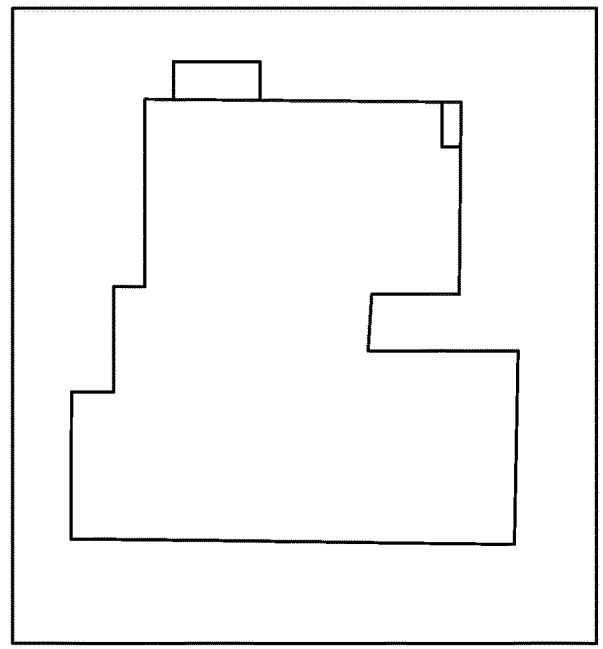
Figure 10H:
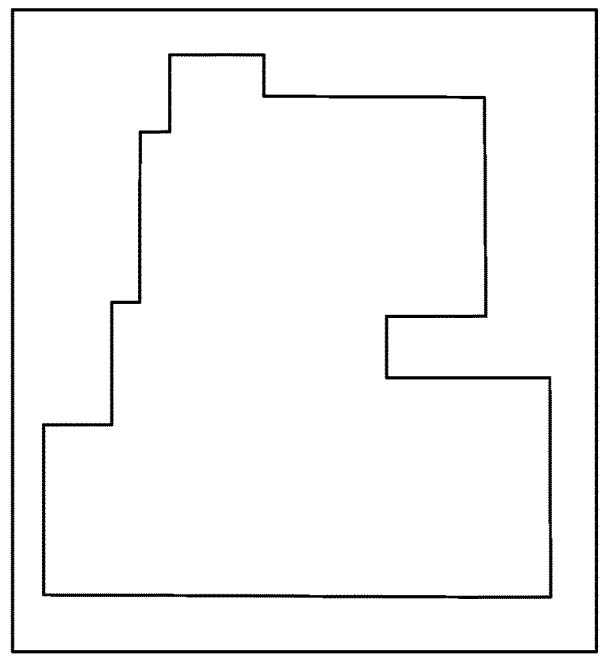

FIG. 9B is a flowchart illustrating step 102 of FIG. 9A in greater detail. Step 102 comprises an algorithm that infers the missing contour lines, and functions as follows. Beginning in step 114, until no new lines are added, for each endpoint in each line, the system sort lines based on distance from the current endpoint to the orthogonal projection onto other lines, where projections that are closer to the current line's other endpoint are penalized. Then, in step 116, the system sets the first line in a sorted list as a candidate line to be consider for connection. Then, in step 118, the system calculates a vector projection of the current line from the candidate line for connection. In step 120, a determination is made as to whether the candidate line for connection and the vector projection are perpendicular to each other. If so, step 122 occurs, wherein the system stores the projection and, if needed, extends the candidate line up to the projection. Otherwise, if the candidate line for connection and the vector projection are parallel, the system stores a new line from the current line and the candidate line for connection.

Once the system completes detection of the contour, detection of rake ends can be accomplished. The straight skeleton algorithm utilized by the system treats all edges as eaves, and infers hip roofs. However, if a gable end is desired, the weight on the contour edge has to be changed to pi/2, which represents a vertical plane or slope. More information on weights is discussed below, but it is helpful to first describe how the system detects rake ends and appropriately sets contour edge weights to pi/2, as opposed to a standard slope that is used for every other face.

Figure 11A:
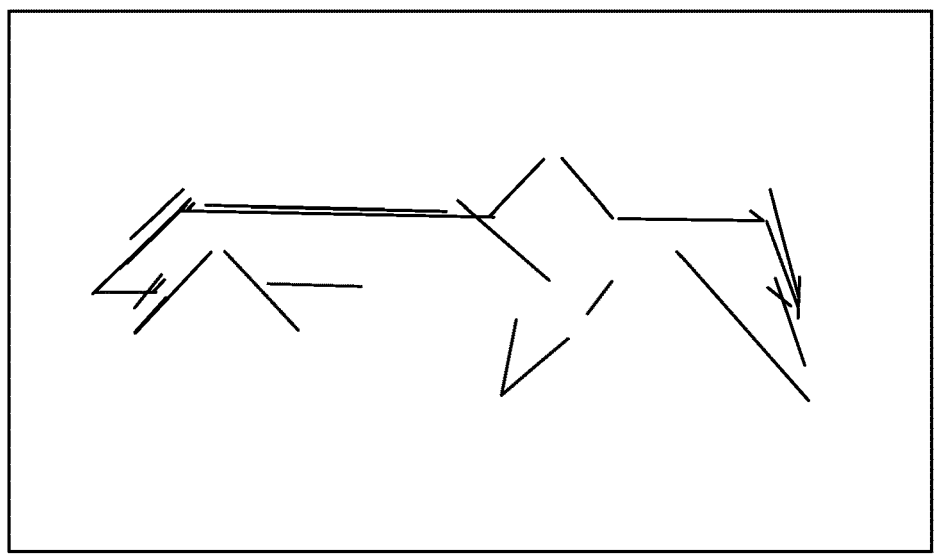
FIGS. 11A-11B are images illustrating detection of roof rakes by the system of the present disclosure.
Figure 11B:
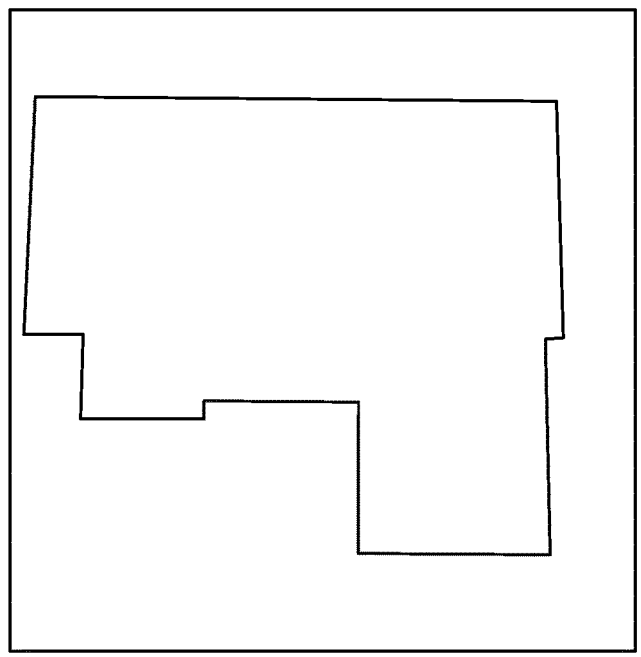

The inputs to the contour inference phase are 3D lines, so this information is leveraged to detect rakes. A list of candidate rake edges is generated by finding all 3D lines with a slope above some threshold, where slope is defined as the slope of the line projected to the xz-plane or yz-plane, whichever is greater. The list of potential rakes is then filtered down to a list of only pairs of lines which are close to each other and have opposite slopes, as this helps to eliminate extraneous lines and create a higher level of confidence in the rakes that are detected. Now, each pair of rake lines are projected onto the plane of the completed contour, and if they project near an edge and are the same length within a threshold, that edge's weight is set to pi/2 (vertical) for use in the straight skeleton. A weight of pi/2 corresponds directly to the slope angle in radians of the plane corresponding to the edge. Rakes are made using a vertical plane along the edge. The process is illustrated in FIGS. 11A-11B which show, respectively, the detected rakes in 3D in the image 142 in FIG. 11A, and the detected rakes projected in the image 144 in FIG. 11B onto a complete contour (bottom edges' weights set to pi/2 (vertical)).

Figure 12A:
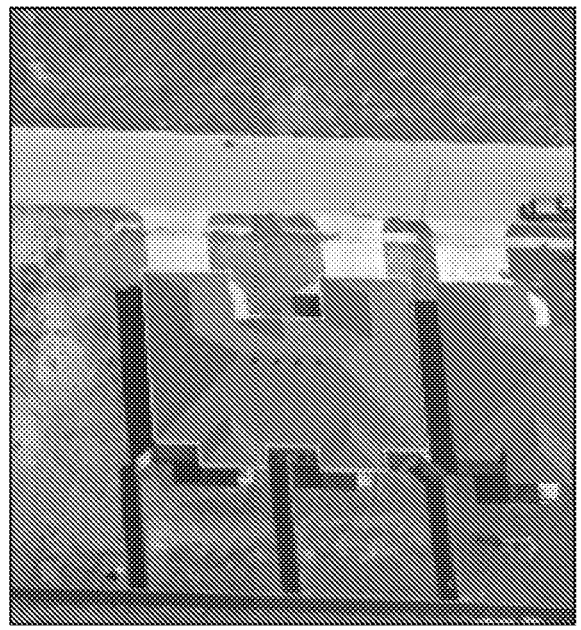
FIGS. 12A-14 are images illustrating inference of interior roof features by the system of the present disclosure.
Figure 12B:
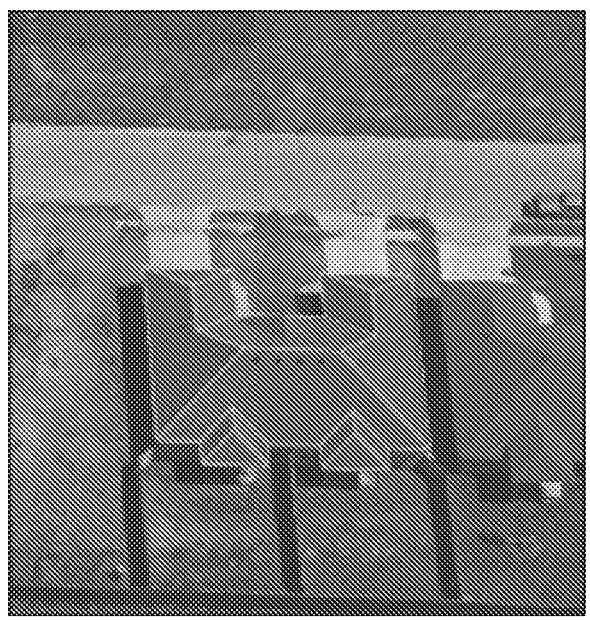
Figure 13:
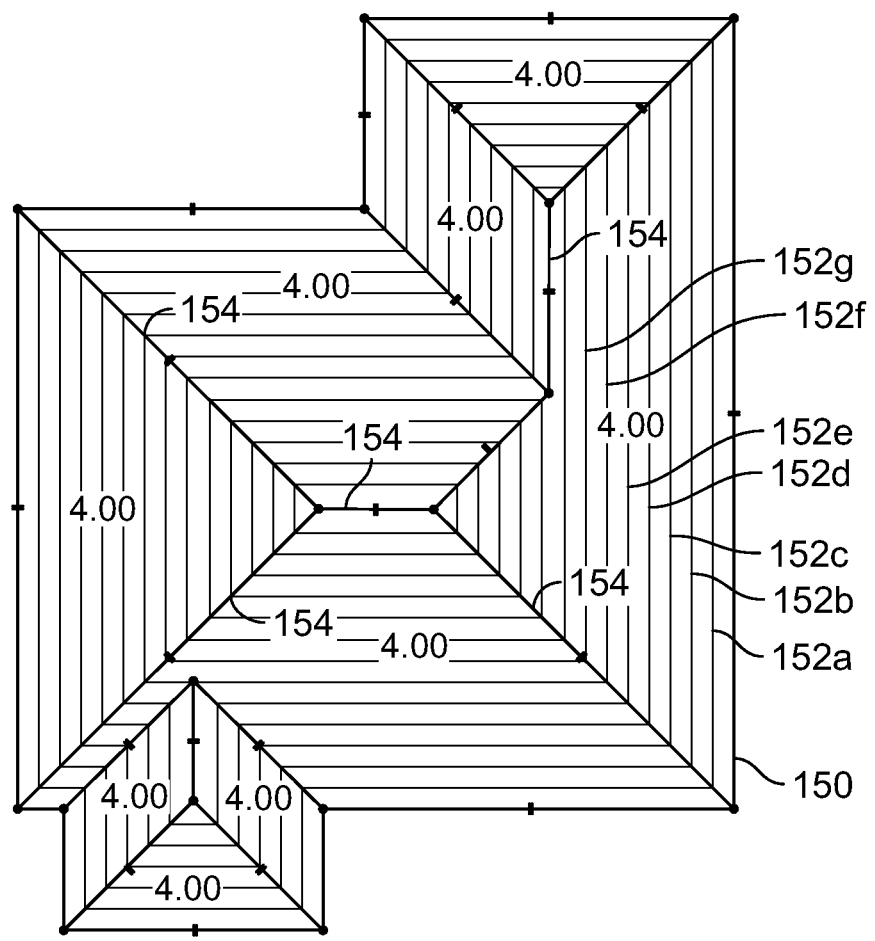

FIGS. 12A-12B illustrates operation of step 22 of FIG. 1, wherein the system infers the interior roof lines from the building contour using a suitable detection algorithm, such as the straight skeleton algorithm. The goal of this phase is to take a closed exterior roof contour and determine its interior lines. Different types of interior lines are determined including hip, valley, and ridge lines. The images in FIGS. 12A-12B show an exterior contour (in the left image) and the interior lines determined (in the right image). The straight skeleton algorithm is now described in detail.

The straight skeleton algorithm is a method of creating a topological representation of a given polygon. The straight skeleton of a polygon is generated by shrinking the exterior contour along angular bisectors at the vertices using plane intersections. There is a directional plane originating from each edge of the input polygon. The shrinking is simulated with a flat sweeping plane that moves upwards in the Z-axis direction, intersecting with each directional plane. By progressively moving a sweeping plane upwards and intersecting directional planes originating from each polygon edge, the straight line interior structure of the input polygon can be inferred. The final roof faces can be reconstructed from the interior lines generated by the sweeping plane simulation. The results of this process are shown in the model illustrated in FIG. 13. The straight skeleton algorithm shrinks from the exterior roof contour line 150 shown in FIG. 13 (which is the input polygon to the algorithm) using a sweeping plane simulation. The polygon shrinks (as illustrated by lines 152*a*-152*f*, i.e., the polygon shrinks from line 152*a* to 152*b*, then from line 152*b* to line 152*c*, etc.) as the sweeping plane moves up, intersecting the directional planes from each polygon edge. Each input edge contains a weight that determines the slope of its directional plane. This weight can be any value between 0 and pi. The weight is the angle in radians above the horizontal plane. A weight greater than pi/2 means the directional plane slopes outward, away from the contour. A weight of 0.0 represents a directional plane that is horizontal. A weight of pi/2 means the directional plane is vertical, creating a rake. This weighted approach is known as Mixed Weight Straight Skeleton (MWSS) and allows for many more interior lines to be properly determined. Ultimately, the sweeping process ends when the interior roof lines 154 are identified.

Figure 14:
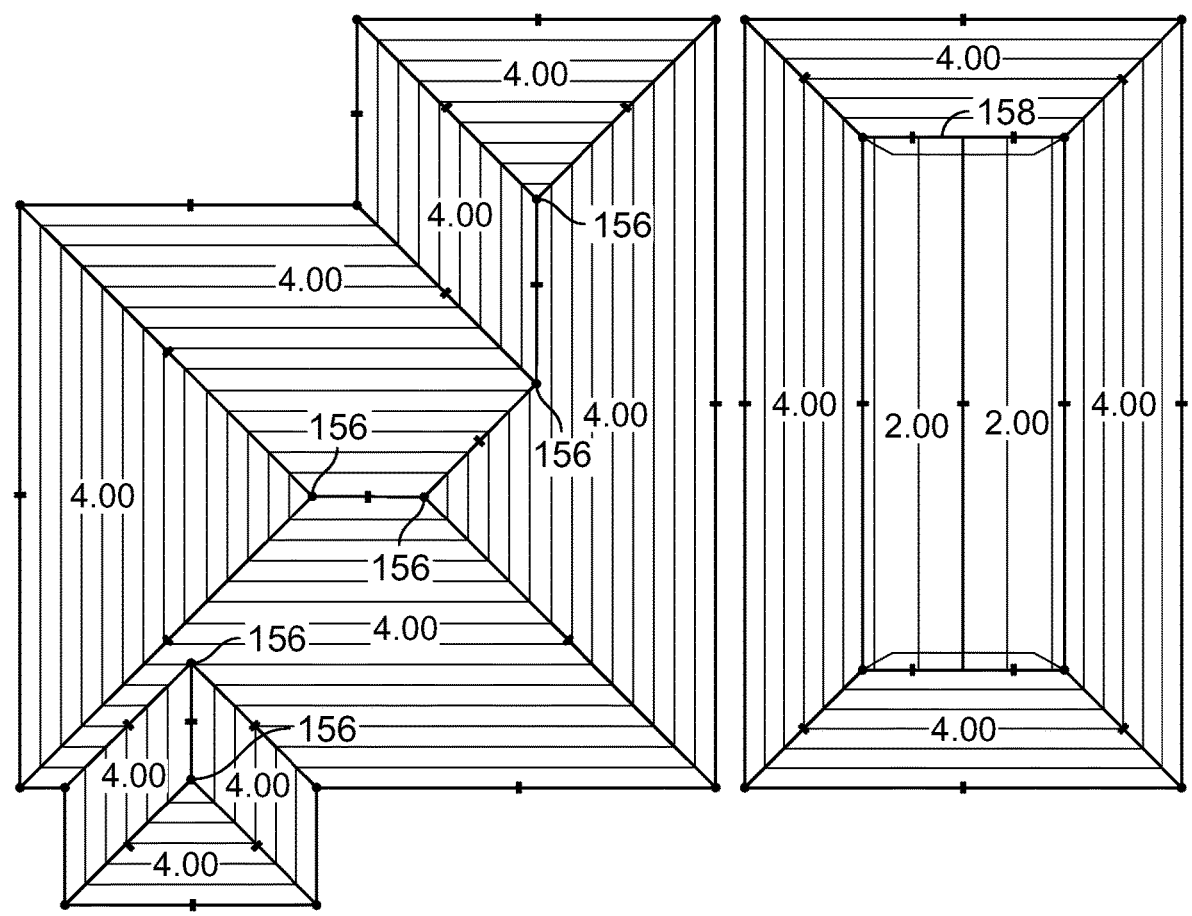

When multiple planes meet in intersections, these are called events. There are multiple types of events, but the two main categories are general intersection events and user events. Examples of the different types of events are shown in FIG. 14. The image to the left has general intersection events occurring at points 156. The example on the right has a user event highlighted in the rectangle 158 that changes the directional planes of all the edges once the given elevation has been reached during the simulation. General intersection events are events caused by three or more directional planes intersecting. Depending on which edges are involved in the event, the event is handled differently. Chains of edges are created and processing using the intra-chain resolution followed by the inter-chain resolution. General intersection events result in interior lines being added. User events modify the behavior of the simulation while it is running. They occur at a given 3D location and modify the behavior of the simulation starting at that location. A user event could change the directional plane of an input edge, or insert a new shape into the existing contour. These events are used to generate a wide variety of roof types and configurations.

The straight skeleton algorithm starts by computing general intersection events for each set of 3 adjacent planes and adding them to a priority queue sorted by lowest Z value. User events are specified at initialization and added to the queue. While there are events in the queue, the algorithm pops the next event from the queue and processes it. When all events are processed, the roof faces are recovered by traversing the edges that participated in the algorithm.

Figure 15:
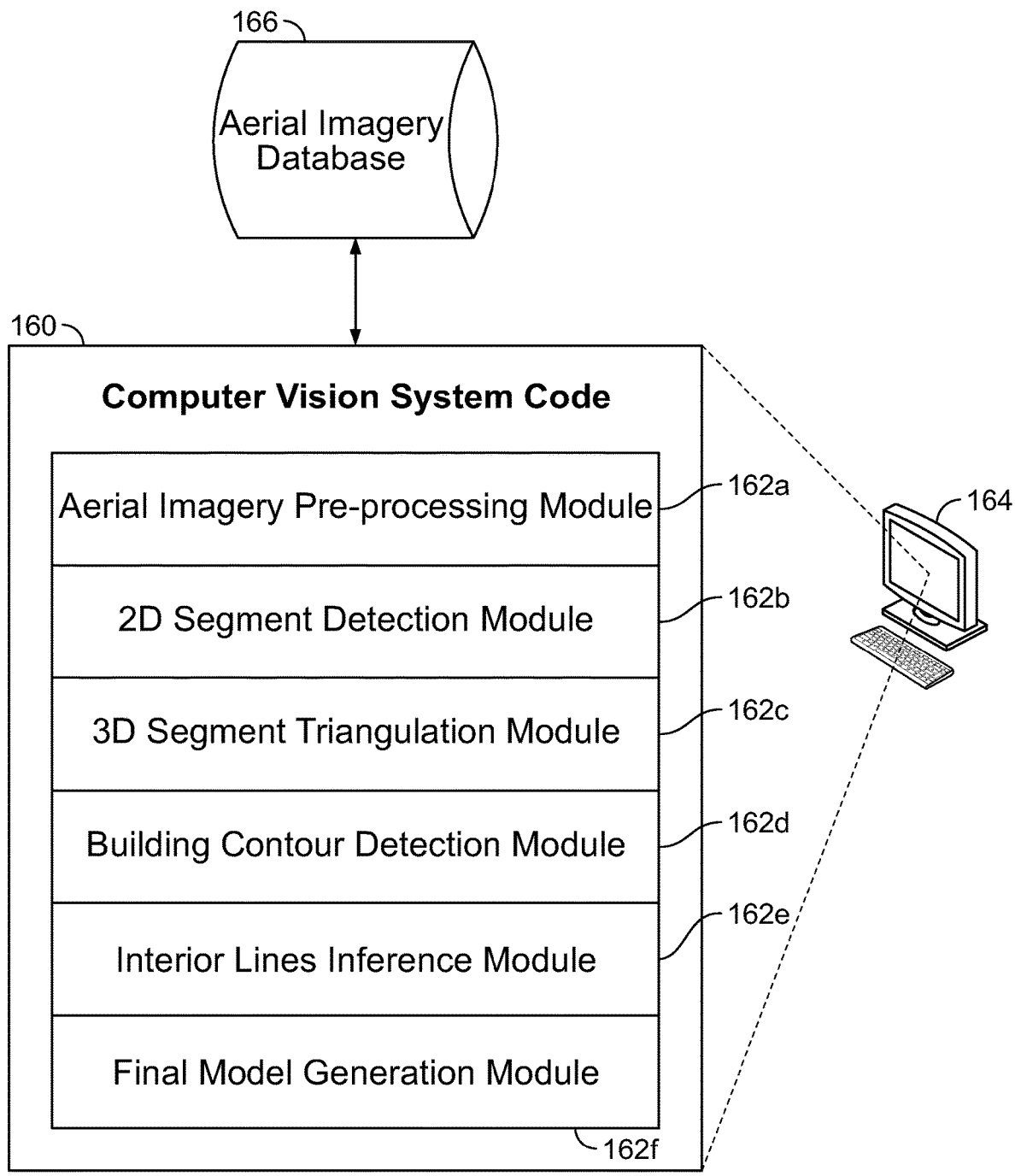
FIG. 15 is a diagram illustrating hardware and software components capable of being utilized to implement the system of the present disclosure.

FIG. 15 is a diagram illustrating hardware and software components capable of implementing the system of the present disclosure. The system could be embodied as computer vision system code (non-transitory, computer-readable instructions) stored on a computer-readable medium and executable by a computer system 164. The code 160 could include various code modules that carry out the steps/processes discussed herein, and could include, but is not limited to, an aerial imagery pre-processing module 162*a*, a 2D segment detection module 162*b*, a 3D segment triangulation module 162*c*, a building contour detection module 162*d*, an interior lines inference module 162*e*, and a final model generation module 162*f*. The computer system 164 could include, but is not limited to, a personal computer, a laptop computer, a tablet computer, a smart telephone, a server, and/or a cloud-based computing platform. Further, the code 160 could be distributed across multiple computer systems communicating with each other over a communications network, and/or stored and executed on a cloud computing platform and remotely accessed by a computer system in communication with the cloud platform. The code 160 communicates with an aerial imagery database 166, which could be stored on the same computer system as the code 160 or on one or more other computer systems in communication with the code 160.

Having thus described the invention in detail, it is to be understood that the foregoing description is not intended to limit the spirit or scope thereof. What is desired to be protected is set forth in the following claims.

What is claimed is:

1. A computer vision system for detecting and modeling features of a building in a plurality of images, comprising:
at least one computer system in communication with a database of aerial imagery; and
computer vision system code executed by said at least one computer system, said computer vision system code causing said computer system to:
receive a plurality of images, each of said images including a view of a structure;
process the plurality of images to detect a contour of the structure;
process the contour of the structure to infer interior roof lines from the detected contour; and
generate a model of the roof of the structure using the detected contour and the interior roof lines, wherein the step of processing the plurality of images further comprises processing a plurality of two-dimensional (2D) line segments identified in the plurality of images to generate a plurality of three-dimensional (3D) line segments, and wherein the computer vision system code causes said computer system to covert pixel coordinates of the 2D line segments to world space coordinates.

2. The system of claim 1, wherein the step of processing the plurality of images further comprises processing the plurality of 3D line segments to detect the contour of the structure.

3. The system of claim 1, wherein the plurality of images comprise a plurality of aerial images.

4. The system of claim 1, wherein the computer vision system code causes said computer system to post-process the 2D lines to remove undesired 2D lines which do not correspond to a structure of interest.

5. The system of claim 4, wherein the system further comprises an edge detection network for post-processing the 2D lines.

6. The system of claim 5, wherein the system further comprises a building segmentation network for post-processing the 2D lines.

7. The system of claim 6, wherein the holistic edge detection network generates a building edge mask for post-processing the 2D lines.

8. The system of claim 6, wherein the building segmentation network generates a building segmentation mask for post-processing the 2D lines.

9. The system of claim 1, wherein the computer vision system code causes said computer system to process 3D line segments using cluster-based detection.

10. The system of claim 9, wherein the computer vision system code causes said computer system to refine the 3D line segments by projecting the 3D line segments onto a 2D mask.

11. The system of claim 1, wherein the computer vision system code causes said computer system to detect roof rake features of the structure.

12. The system of claim 1, wherein step of processing the plurality of images to detect the contour of the structure uses a contour inference algorithm.

13. A computer vision method for detecting and modeling features of a building in a plurality of images, comprising the steps of:
receiving at a computer system a plurality of images, each of said images including a view of a structure;
processing the plurality of images to detect a contour of the structure;
processing the contour of the structure to infer interior roof lines from the detected contour;
generating a model of the roof of the structure using the detected contour and the interior roof lines,
wherein the step of processing the plurality of images further comprises processing a plurality of two-dimensional (2D) line segments identified in the plurality of images to generate a plurality of three-dimensional (3D) line segments; and
converting pixel coordinates of the 2D line segments to world space coordinates.

14. The method of claim 13, wherein the step of processing the plurality of images further comprises processing the plurality of 3D line segments to detect the contour of the structure.

15. The method of claim 13, further comprising post-processing the 2D lines to remove undesired 2D lines which do not correspond to a structure of interest.

16. The method of claim 15, further comprising applying an edge detection network for post-processing the 2D lines.

17. The method of claim 16, further comprising applying a building segmentation network for post-processing the 2D lines.

18. The method of claim 17, further comprising generating a building edge mask for post-processing the 2D lines.

19. The method of claim 17, further comprising generating a building segmentation mask for post-processing the 2D lines.

20. The method of claim 13, further comprising processing 3D line segments using cluster-based detection.

21. The method of claim 20, further comprising refining the 3D line segments by projecting the 3D line segments onto a 2D mask.

22. The method of claim 13, further comprising detecting roof rake features of the structure.

23. The method of claim 13, wherein processing the plurality of images to detect the contour of the structure uses a contour inference algorithm.

24. A non-transitory, computer-readable medium having computer-readable instructions stored thereon which, when executed by a computer system, causes the computer system to execute the steps of:
receiving at the computer system a plurality of images, each of said images including a view of a structure;
processing the plurality of images to detect a contour of the structure;
processing the contour of the structure to infer interior roof lines from the detected contour;
generating a model of the roof of the structure using the detected contour and the interior roof lines,
wherein the step of processing the plurality of images further comprises processing a plurality of two-dimensional (2D) line segments to generate a plurality of three-dimensional (3D) line segments; and
converting pixel coordinates of the 2D line segments to world space coordinates.

25. The computer-readable medium of claim 4, wherein the step of processing the plurality of images further comprises processing the plurality of 3D line segments to detect the contour of the structure.

26. The computer-readable medium of claim 24, further comprising post-processing the 2D lines to remove undesired 2D lines which do not correspond to a structure of interest.

27. The computer-readable medium of claim 26, further comprising applying an edge detection network for post-processing the 2D lines.

28. The computer-readable medium of claim 27, further comprising applying a building segmentation network for post-processing the 2D lines.

29. The computer-readable medium of claim 28, further comprising generating a building edge mask for post-processing the 2D lines.

30. The computer-readable medium of claim 28, further comprising generating a building segmentation mask for post-processing the 2D lines.

31. The computer-readable medium of claim 24, further comprising processing 3D line segments using cluster-based detection.

32. The computer-readable medium of claim 31, further comprising refining the 3D line segments by projecting the 3D line segments onto a 2D mask.

33. The computer-readable medium of claim 24, further comprising detecting roof rake features of the structure.

34. The computer-readable medium of claim 24, wherein processing the plurality of images to detect the contour of the structure uses a contour inference algorithm.

\* \* \* \* \*

UNITED STATES PATENT AND TRADEMARK OFFICE
CERTIFICATE OF CORRECTION

| | |
|---|---|
| PATENT NO. | : 12,198,364 B2 |
| APPLICATION NO. | : 17/499258 |
| DATED | : January 14, 2025 |
| INVENTOR(S) | : Jeffery Devon Lewis, Bryce Zachary Porter and Ryan Mark Justus |

Page 1 of 1

It is certified that error appears in the above-identified patent and that said Letters Patent is hereby corrected as shown below:

On the Title Page

Under item (57) the Abstract, the second sentence of the Abstract, the word "last" should be deleted and replaced with the word "least"

In the Claims

In Column 12, Claim 25, Line 42, the claim should depend from claim "24" not claim "4"

Signed and Sealed this
Seventeenth Day of June, 2025

Coke Morgan Stewart
*Acting Director of the United States Patent and Trademark Office*